March 17, 1942.   W. D. HORSLEY   2,276,616
POLYPHASE ALTERNATING CURRENT DYNAMO ELECTRIC MACHINE
Filed Oct. 25, 1940   4 Sheets-Sheet 2

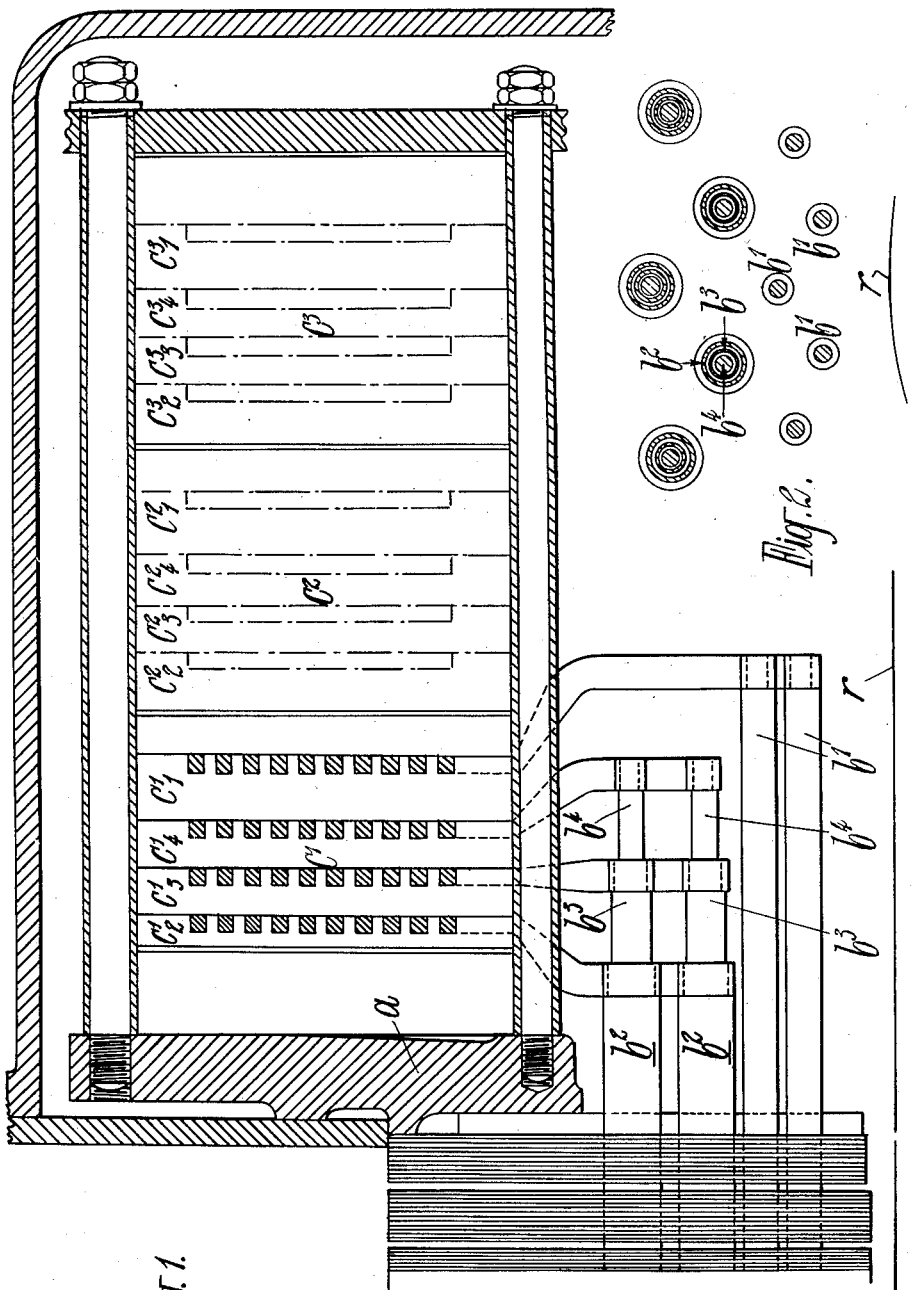

INVENTOR
William Douglas Horsley
BY
ATTORNEYS

March 17, 1942.  W. D. HORSLEY  2,276,616

POLYPHASE ALTERNATING CURRENT DYNAMO ELECTRIC MACHINE

Filed Oct. 25, 1940  4 Sheets-Sheet 3

INVENTOR
William Douglas Horsley
BY Sawyer Kennedy Hinman
+Hazard
ATTORNEYS

March 17, 1942.  W. D. HORSLEY  2,276,616
POLYPHASE ALTERNATING CURRENT DYNAMO ELECTRIC MACHINE
Filed Oct. 25, 1940  4 Sheets-Sheet 4
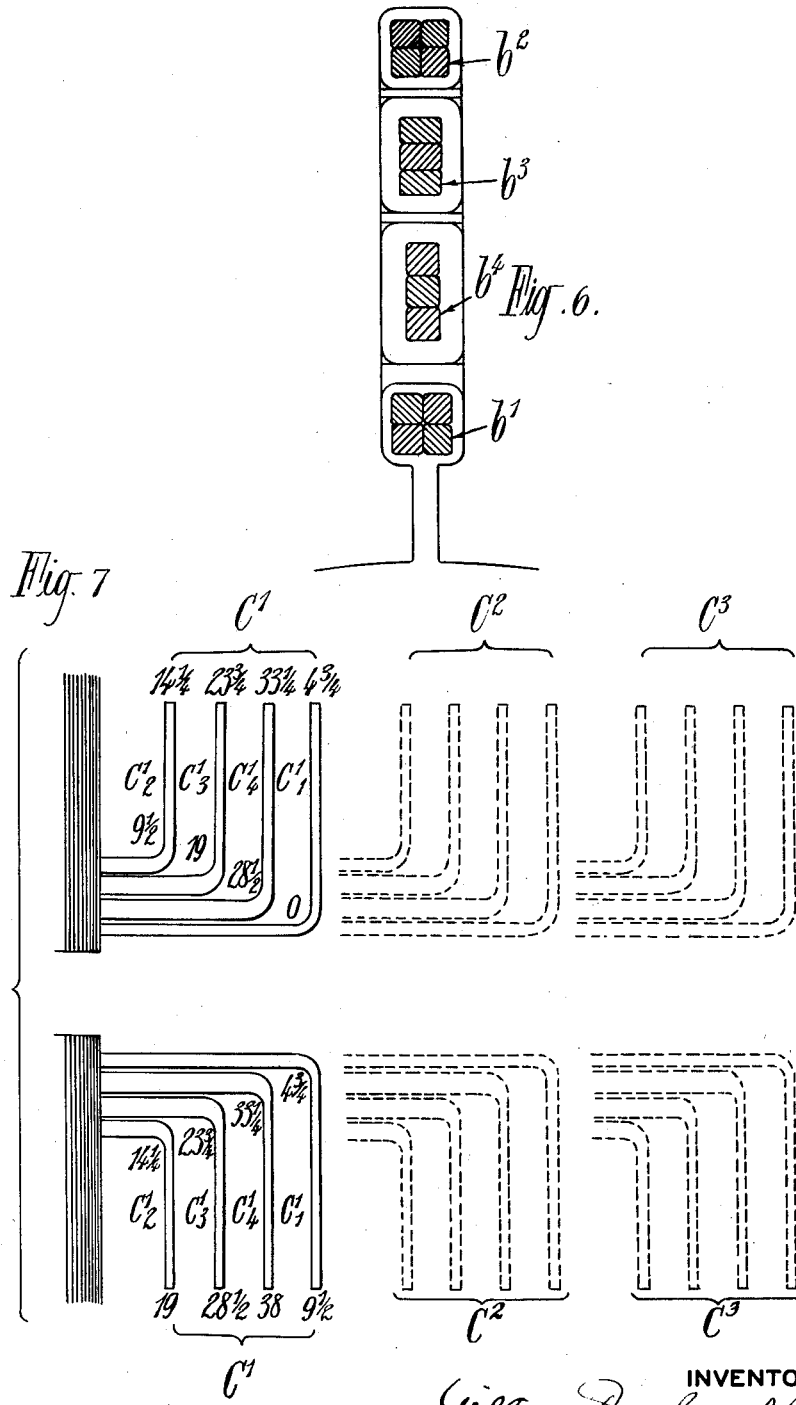

Patented Mar. 17, 1942

2,276,616

UNITED STATES PATENT OFFICE 2,276,616

POLYPHASE ALTERNATING CURRENT DYNAMOELECTRIC MACHINE

William Douglass Horsley, Newcastle-on-Tyne, England, assignor to C. A. Parsons & Company, Limited, Newcastle-on-Tyne, England Application October 25, 1940, Serial No. 362,753
In Great Britain November 21, 1939

4 Claims. (Cl. 171—206)

This invention relates to polyphase A. C. dynamoelectric machines suitable for very high voltages and is particularly applicable in connection with windings of the "graded type" such as the concentric conductor windings described in United States Patent No. 1,582,427 of the 27th of April, 1926, and other types of graded windings such as described in British specification No. 312,217 of February 22, 1928.

In the case of a 3-phase winding having the end connections arranged in three separate banks or groups, one for each phase, a graded winding therefor may be divided into any number of sections and for an alternator designed to generate at say 33 kv., each phase may be divided into 3 sections, each bank of end windings comprising one phase being subdivided into three groups corresponding to each section.

With such arrangement the group of low potential conductors of the inside phase is usually situated nearest to the stator core, the next group comprising intermediate potential conductors and the last group of the bank comprising the maximum potential conductors; the group of low potential conductors of the second phase is spaced at a suitable distance from the latter group and similarly the maximum potential conductors of the second phase are adjacent to the low potential conductors of the third phase. In a 33 kv. alternator the maximum potential between these particular groups of conductors between phases is 23 kv.

Similarly in an alternator designed for 66 kv. and having each phase divided into three sections, the maximum operating potential between phases would be 46 kv. Again, if each phase is divided into four sections with a similar arrangement of end connections, the maximum voltage between phases would be 43½ kv.

The main object of the present invention is to provide a dynamoelectric machine suitable for very high voltages in which the maximum potential difference between conductors of different phases is reduced.

A further object is to provide such machines wherein the maximum voltage of parts of the end windings to earth is reduced.

The invention consists in a polyphase A. C. dynamoelectric machine for very high voltage having the winding or windings of each phase divided into three or more sections, the first section of low potential end-connection conductors being disposed between the group of high potential conductors of the same phase and the group of the second section of low potential end-connection conductors of the adjacent phase.

The invention also consists in a dynamoelectric machine as set forth in the preceding paragraph, wherein the low potential conductors of each phase or a section thereof, are situated at the top of the slots containing the other conductors and the former conductors where they project from the core thus act as an intermediate potential shield between the high potential conductors of each phase and the rotor body which is at earth potential.

The invention also consists in a polyphase A. C. dynamoelectric machine for very high voltage having the winding or windings of each phase divided into three or more sections the first section of low potential end-connection conductors being disposed between the group of high potential conductors of the same phase and the group of the second section of low potential end-connection conductors of the adjacent phase, the conductors of the sections other than that of the lowest potential being formed as concentric conductors with intervening insulation.

The invention also consists in a polyphase A. C. dynamoelectric machine for very high voltage having the winding or windings of each phase divided into three or more sections, the first section of low potential end-connection conductors being disposed between the group of high potential conductors of the same phase and the group of the second section of low potential end-connection conductors of the adjacent phase, the insulation of the conductors of the several sections being graded in thickness in correspondence with the potentials of the individual sections.

In applying the invention in one form to an alternator having each of the phases divided into four sections, the second section of low potential end connections of phase I are grouped nearest to the stator core end plate. Then follow an intermediate voltage section of end connections, then the section of high potential end connections followed by the section of lowest potential end connections of that phase. The second, third and fourth sections of phase II would then follow in sequence. The low potential conductors of each phase are situated at the top of the slots containing the other conductors, and the former conductors $b_1$ where they project from the core slot ends thus act as an intermediate potential shield between the high potential conductors of each phase and the rotor body $r$ which is at earth potential.

The conductors and end connections of phase III are likewise arranged in the same sequence.

With this arrangement the maximum potential difference between phase occurs between the first section of low potential conductors of phase I and the second section $c^2_2$ of low potential conductors of phase II which is a 66 kv. machine does not exceed 25¼ kv. The maximum potential difference between the low voltage and high voltage sections of the same phase is 28½ kv. It will thus be seen that with this arrangement the maximum voltage between adjacent groups of end connections has been reduced from 43½ kv. to 28½ kv.

Referring to the accompanying diagrammatic drawings:

Figure 1 is a vertical sectional view of part of one end of a three-phase high-voltage alternator embodying the present invention, the conductors being mainly of concentric type.

Figure 2 is a vertical cross-sectional view of part thereof showing the arrangement of the conductors in the stator.

Figure 6 is a vertical cross-sectional view illustrating the arrangement of the conductor slots around the bore of the stator of Figure 5, and Figure 7 is a schematic arrangement of the windings at one end of the alternator of Figure 5 showing the normal operating potentials to earth of each part of the winding.

In the succeeding description of two specific examples, the letters $b_1$, $b_2$, $b_3$, and $b_4$ are used to designate the conductors of the four respective sections of phase I and the letters $c^1_1$, $c^1_2$, $c^1_3$, $c^1_4$ to designate the corresponding group of end connections, $b_1$ and $c_1$ being at the lowest potential and $b_4$ and $c_4$ being at the highest potential above earth potential.

In the example for a 3-phase alternator having each phase of the winding divided into four sections as shown in Figure 1, the base of each stator-core-slot accommodates a triple-concentric conductor comprising a central core conductor $b_4$, surrounded, with intervening insulation, by a pair of conductor tubes $b_3$, $b_2$, as in U. S. Patent No. 1,582,427.

A further similar triple-concentric conductor $b_4$, $b_3$, $b_2$ is next accommodated in the slot and finally low potential conductors $b_1$ are accommodated in the slot nearest to the slot opening.

The arrangement of the conductors around the bore of the stator is illustrated in section in Figure 2.

The conductors $b_1$, $b_2$, $b_3$, $b_4$ emerge from the ends of the slots in the stator core to form or receive the end windings $c^1_1$, $c^1_2$, $c^1_3$, $c^1_4$.

The second section of low voltage end connections $c^1_2$ are nearest to the core end plate and are followed axially by the third section of connections $c^1_3$, then the fourth section of high potential connections $c^1_4$ and finally the lowest potential connections $c^1_1$ of that phase.

The second section of low potential end connections $c^2_2$ of the second phase and the remaining sections $c^2_3$, $c^2_4$, $c^2_1$ of that phase then follow in sequence; finally come the sections of phase III.

In accordance with normal practice the end connections of each phase are divided into two main parts each being arranged on opposite sides of the stator. Each half of each group is connected in series and then all groups in series to form one phase.

If for example it be assumed that the windings are designed for 66 kv. between phases, the maximum potential from phase to earth being 38 kv., then the potentials of the conductors in the first half of the first or lowest potential group vary from 0 to 4¾ kv. and in the second half from 4¾ kv. to 9½ kv. The potentials in the first half of the second group vary from 9½ kv. to 14¼ kv. and in the second half from 14¼ kv. to 19 kv.; the first half of group 3 from 19 kv. to 23¾kv. and the second half from 23¾ kv. to 28½ kv.; the first half of the fourth and highest potential section from 28½ kv. to 33¼ kv. and the second half from 33¼ kv. to 38 kv.

Figure 3:
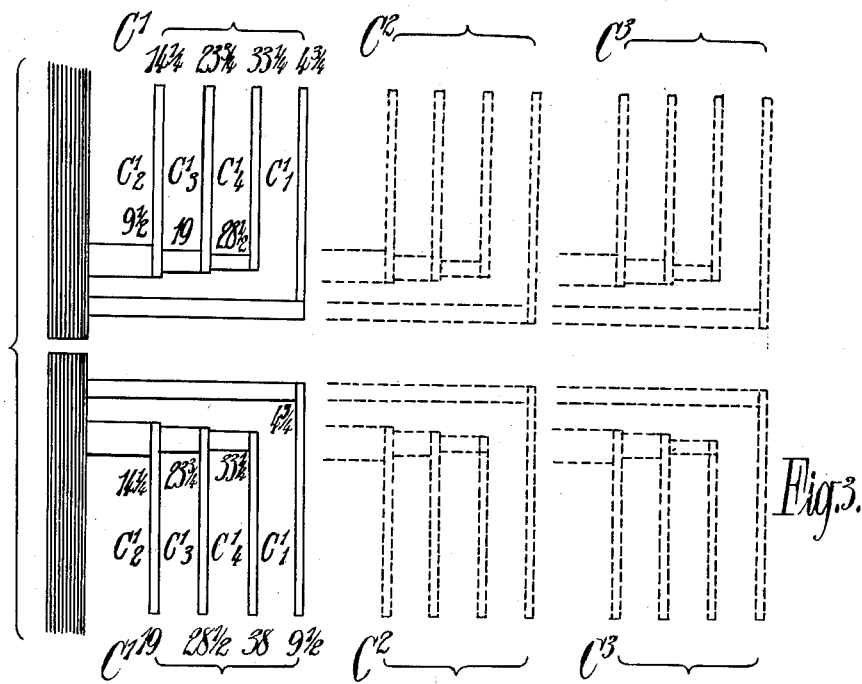
Figure 3 is a schematic arrangement of the alternator windings at one end thereof indicating the normal operating potential to earth of each part of the windings.

This disposition of potentials of the conductors in each half group is indicated in Figure 3 in which the numerals 0, 4¾, 9½ and so on represent the potentials in kilovolts obtaining at the preceding end of the conductor or end connection adjacent to which the numerals are placed.

The same potential distribution is obtained in the second and third phases.

Owing to the arrangement of the three phases, part of both of the first and second halves of the lowest potential group of phase I ($c^1_1$) is adjacent at different points in the circumference of the end windings to either and both halves of the second lowest potential group of conductors of phase II ($c^2_2$).

Figure 4:
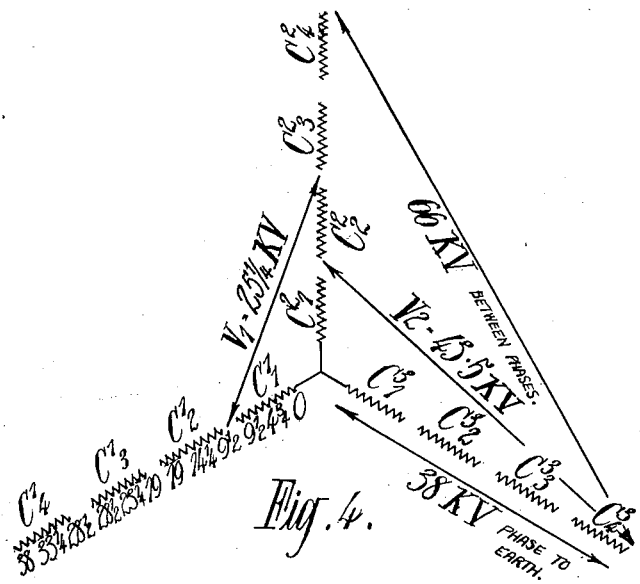
Figure 4 is a diagram showing vectorially potentials in each phase and phase sections of the windings shown in Figure 1.

The maximum potential difference occurs between a conductor in phase II at 19 kv. and a conductor in phase I at 9½ kv.; reference to the vector diagram of Figure 4 shows that the maximum voltage difference between phases is only 25¼ kv. as represented by the vector $V_1$. The maximum potential difference between phases with the windings arranged in the usual manner would be 43.5 kv. as indicated by the vector $V_2$.

The maximum potential difference between groups of the same phases is the arithmetical difference between 33¼ kv. and 4¾ kv. or between 38 kv. and 9½ kv. which is 28½ kv. Similar voltage conditions exist in and between phases II and III and III and I.

As previously stated, the low voltage sections of each phase $c^1_1$, $c^2_1$, $c^3_1$ form an intermediate potential shield between the high potential conductors of each phase and the rotor body and between other parts of the windings and parts of the stator and winding supports at earth potential. The maximum potential of the low voltage section to earth is 9½ kv. With the windings arranged in the usual manner the maximum potential to earth is 38 kv.

It is thus seen that with the windings of a typical alternator embodying the present invention, the maximum potential difference between conductors of different phases is reduced by more than 25% and the maximum voltage of parts of the end windings to earth by 75%.

Figure 5:
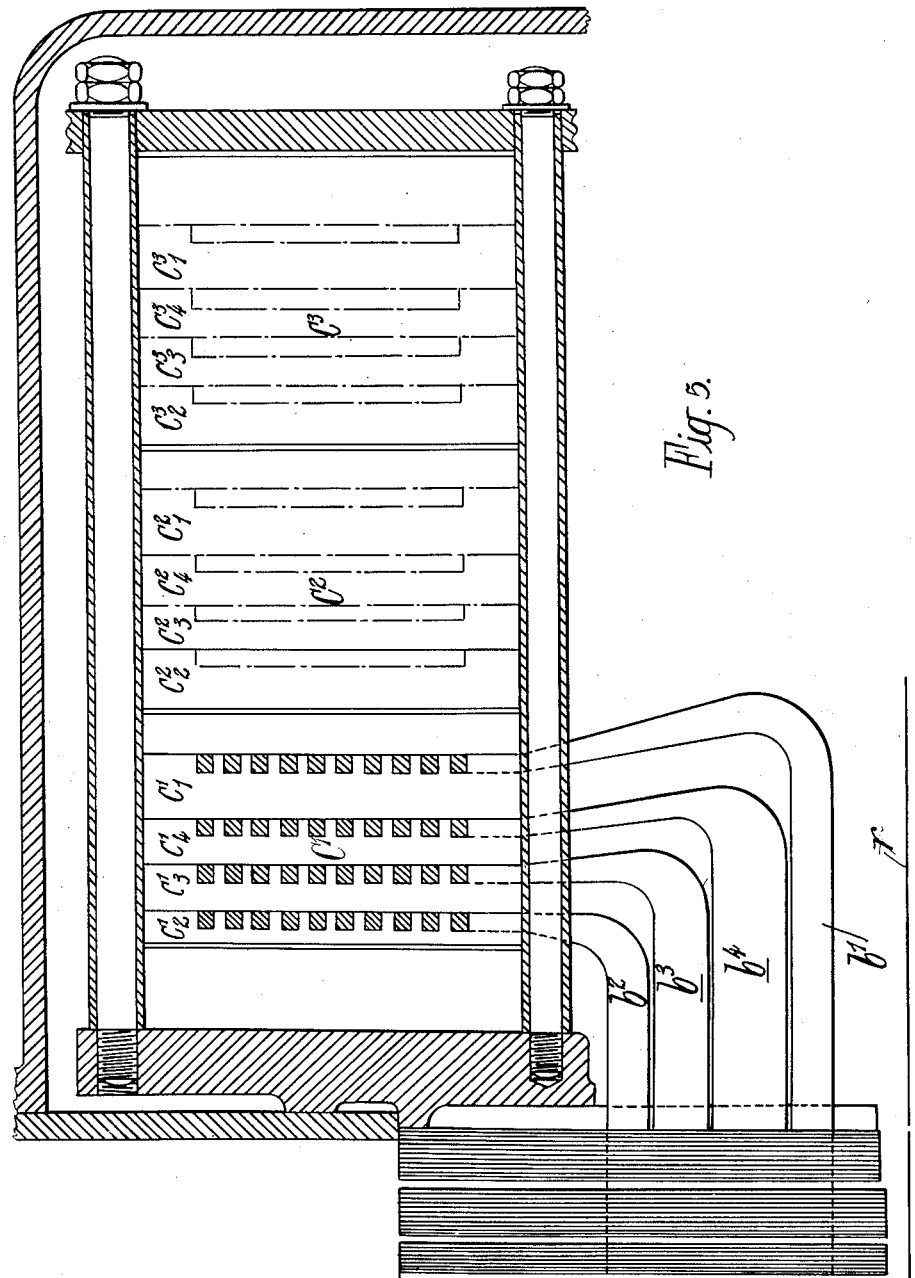
Figure 5 is a vertical sectional view of part of one end of a modified form of alternator embodying the present invention having conductors graded in sections, for example, as described in British patent specification No. 312,217.

In a modified arrangement illustrated in Figures 5, 6 and 7 embodying a three-phase winding arranged in accordance with British patent specification No. 312,217 and having each phase divided into four sections, each stator-core-slot accommodates conductors $b_2$, $b_3$, $b_4$ and $b_1$, the conductor $b_2$ lying nearest to the stator core and the conductor $b_1$ lying nearest to the slot opening in the bore.

In the example last described above, the end windings are also disposed in three phase banks each containing four groups of connections.

The invention is equally applicable to windings in which the phases are divided into any other number of sections.

I claim:

1. A polyphase A. C. dynamoelectric machine for very high voltage having the winding or windings of each phase divided into three or more sections, the first section of low potential end-connection conductors being disposed between the group of high potential conductors of the same phase and the group of the second section of low potential end-connection conductors of the adjacent phase.

2. A dynamoelectric machine as claimed in claim 1, wherein the low potential conductors of each phase or a section thereof, are situated at the top of the slots containing the other conductors and the former conductors where they project from the core thus act as an intermediate potential shield between the high potential conductors of each phase and the rotor body which is at earth potential.

3. A polyphase A. C. dynamoelectric machine for very high voltage having the winding or windings of each phase divided into three or more sections, the first section of low potential end-connection conductors being disposed between the group of high potential conductors of the same phase and the group of the second section of low potential end-connection conductors of the adjacent phase, the conductors of the sections other than that of the lowest potential being formed as concentric conductors with intervening insulation.

4. A polyphase A. C. dynamoelectric machine for very high voltage having the winding or windings of each phase divided into three or more sections, the first section of low potential end-connection conductors being disposed between the group of high potential conductors of the same phase and the group of the second section of low potential end-connection conductors of the adjacent phase, the insulation of the conductors of the several sections being graded in thickness in correspondence with the potentials of the individual sections.

WILLIAM DOUGLASS HORSLEY.